(12) United States Patent
Pinkus et al.

(10) Patent No.: US 8,019,531 B2
(45) Date of Patent: Sep. 13, 2011

(54) NAVIGATION DEVICE AND METHOD FOR DISPLAYING ALTERNATIVE ROUTES

(75) Inventors: Ayal Pinkus, Amsterdam (NL); Edwin Neef, Amsterdam (NL); Sven-Erik Jurgens, Amsterdam (NL); Mark Gretton, London (GB)

(73) Assignee: Tomtom International B.V., Amsterdam (NL)

( * ) Notice: Subject to any disclaimer, the term of this patent is extended or adjusted under 35 U.S.C. 154(b) by 1256 days.

(21) Appl. No.: 10/547,158

(22) PCT Filed: Feb. 26, 2004

(86) PCT No.: PCT/GB2004/000794
§ 371 (c)(1),
(2), (4) Date: May 18, 2006

(87) PCT Pub. No.: WO2004/076976
PCT Pub. Date: Sep. 10, 2004

(65) Prior Publication Data
US 2007/0005233 A1  Jan. 4, 2007

(30) Foreign Application Priority Data

Feb. 26, 2003  (GB) .................................. 0304358.5
Mar. 7, 2003  (GB) .................................. 0305175.2

(51) Int. Cl.
*G01C 21/00* (2006.01)
*G01C 21/34* (2006.01)
(52) U.S. Cl. .......... 701/200; 701/26; 701/209; 701/210; 340/995.19; 340/995.21; 340/995.23

(58) Field of Classification Search ........................ None
See application file for complete search history.

(56) References Cited

U.S. PATENT DOCUMENTS

| | | | |
|---|---|---|---|
| 4,992,947 A * | 2/1991 | Nimura et al. ................ 701/210 |
| 5,243,528 A | 9/1993 | Lefebvre | |
| 5,539,429 A * | 7/1996 | Yano et al. .................... 345/173 |
| 5,544,060 A | 8/1996 | Fujii et al. | |
| 5,731,979 A | 3/1998 | Yano et al. | |
| 5,751,576 A * | 5/1998 | Monson .......................... 700/83 |
| 5,859,628 A | 1/1999 | Ross et al. | |
| 5,877,751 A | 3/1999 | Kanemitsu et al. | |
| 5,928,307 A * | 7/1999 | Oshizawa et al. ............. 701/210 |
| 5,948,040 A * | 9/1999 | DeLorme et al. ............. 701/201 |
| 5,982,301 A | 11/1999 | Ohta et al. | |
| 6,040,824 A * | 3/2000 | Maekawa et al. ............. 345/173 |
| 6,118,389 A | 9/2000 | Kamada et al. | |
| 6,208,344 B1 * | 3/2001 | Holzman et al. .............. 715/846 |

(Continued)

FOREIGN PATENT DOCUMENTS

DE  19527485  8/1996

(Continued)

OTHER PUBLICATIONS

Search Report under Section 17 and Combined Search and Examination Report under Sections 17 & 18(3) dated Jul. 29 and 30, 2004 for corresponding UK Patent GB0404302.2—3 pages.

*Primary Examiner* — Jack Keith
*Assistant Examiner* — Jonathan M Dager (57) ABSTRACT

A navigation device has a route re-calculation function. This is activated by the user touching the screen to task away from the normal navigation map mode to a menu screen which displays multiple types of route re-calculation options.

22 Claims, 3 Drawing Sheets

U.S. PATENT DOCUMENTS

| | | | |
|---|---|---|---|
| 6,321,158 B1* | 11/2001 | DeLorme et al. | 701/201 |
| 6,373,472 B1* | 4/2002 | Palalau et al. | 345/173 |
| 6,826,473 B1* | 11/2004 | Burch et al. | 701/207 |
| 6,836,728 B2* | 12/2004 | Shimabara | 701/212 |
| 7,221,364 B2* | 5/2007 | Matsumoto et al. | 345/419 |
| 7,474,960 B1* | 1/2009 | Nesbitt | 701/209 |
| 2001/0029425 A1* | 10/2001 | Myr | 701/200 |
| 2003/0018427 A1* | 1/2003 | Yokota et al. | 701/208 |
| 2003/0065432 A1* | 4/2003 | Shuman et al. | 701/48 |
| 2003/0069693 A1* | 4/2003 | Snapp et al. | 701/213 |
| 2003/0105586 A1* | 6/2003 | Arai et al. | 701/211 |
| 2003/0182052 A1* | 9/2003 | DeLorme et al. | 701/201 |
| 2004/0029593 A1* | 2/2004 | Skinner | 455/456.1 |
| 2004/0032344 A1* | 2/2004 | Slickers | 340/995.19 |
| 2004/0073356 A1* | 4/2004 | Craine | 701/117 |
| 2004/0172192 A1* | 9/2004 | Knutson | 701/208 |
| 2004/0204845 A1* | 10/2004 | Wong | 701/210 |
| 2007/0067104 A1* | 3/2007 | Mays | 701/211 |

FOREIGN PATENT DOCUMENTS

| | | |
|---|---|---|
| EP | 0918310 | 5/1999 |
| EP | 0929058 | 7/1999 |
| JP | 6068383 | 3/1994 |
| JP | 9152352 | 6/1997 |

* cited by examiner

NAVIGATION DEVICE AND METHOD FOR DISPLAYING ALTERNATIVE ROUTES

CROSS REFERENCE TO RELATED APPLICATIONS

This application claims the priority of PCT Application No. PCT/GB2004/000794 filed on Feb. 26, 2004; GB Patent Application No. 0304358.5 filed on Feb. 26, 2003; and, GB Patent Application No. 0305175.2 filed on Mar. 7, 2003, the entire contents of which are hereby incorporated in total by reference.

BACKGROUND OF THE INVENTION

1. Field of the Invention

This invention relates to a navigation device that can display navigation data. The device find particular application as an in-car navigation system.

2. Description of the Prior Art

GPS based devices are well known and are widely employed as in-car navigation systems. Reference may be made to the Navigator series software from the present assignee, TomTom B.V. This is software that, when running on a PDA (such as a Compaq iPaq) connected to an external GPS receiver, enables a user to input to the PDA a start and destination address. The software then calculates the best route between the two end-points and displays instructions on how to navigate that route. By using the positional information derived from the GPS receiver, the software can determine at regular intervals the position of the PDA (typically mounted on the dashboard of a vehicle) and can display the current position of the vehicle on a map and display (and speak) appropriate navigation instructions (e.g. 'turn left in 100 m'). Graphics depicting the actions to be accomplished (e.g. a left arrow indicating a left turn ahead) can be displayed in a status bar and also be superimposed over the applicable junction's/turnings etc in the roads shown in the map itself. Reference may also be made to devices that integrate a GPS receiver into a computing device programmed with a map database and that can generate navigation instructions on a display. The term 'navigation device' refers to a device that enables a user to navigate to a pre-defined destination. The device may have an internal system for receiving location data, such as a GPS receiver, or may merely be connectable to a receiver that can receive location data.

It is known to enable in-car navigation systems to allow the driver, whilst driving in a car along a route calculated by the navigation system, to initiate a route re-calculation. This is useful where the vehicle is faced with construction work or heavy congestion.

Reference may be made to U.S. Pat. No. 6,118,389 which discloses techniques for calculating a re-route. Initiating the re-route calculation requires activation of a specific detour switch, which may however be inconvenient to the user. Reference may also be made to U.S. Pat. No. 5,544,060, which enables a device to preview the calculated route by displaying in successive screens each different road and turning that the vehicle has to take; the user however has to manually sequence through each successive screen using a preview switch until he reaches the road that he wants to exclude from the route; he then selects a cancel switch; a new route is calculated which excludes the cancelled road.

The present invention aims to improve on the user interaction aspects of initiating a route recalculation.

SUMMARY OF THE INVENTION

In a first aspect, there is a navigation device programmed with a map database and software that enables a route to be planned between two user-defined places, wherein the device is further programmed to be able to display a navigation map on a touch screen display, the map updating the current position of the device; wherein the user can, by touching the screen, task away from the navigation map to a menu screen which displays one or more options that, if selected through a further touch action, initiate a re-calculation of the route.

This user interaction approach is simpler, more flexible and more intuitive than prior art approaches that require the user to activate a specific, hardware-based detour switch. Further, since a route re-calculation only requires 2 quick touch actions to the screen, it can be safely completed by a driver even whilst driving.

The menu screen may displays selectable options relating to one or more of the following functions:
    (a) calculate alternative route;
    (b) calculate alternative route without including a predefined extend of the road ahead;
    (c) calculate alternative route without including a predefined road;
    (d) revert to original route.

This approach gives the driver far greater flexibility in his route re-calculation options than was available with prior art, hard-wired detour switches.

BRIEF DESCRIPTION OF THE DRAWINGS

The present invention will be described with reference to the accompanying drawings, in which.

DETAILED DESCRIPTION

System Overview

The present invention is implemented in software from TomTom B.V. called Navigator. Navigator software runs on a touch screen (i.e. stylus controlled) Pocket PC powered PDA device, such as the Compaq iPaq. It provides a GPS based navigation system when the PDA is coupled with a GPS receiver. The combined PDA and GPS receiver system is designed to be used as an in-vehicle navigation system. The invention may also be implemented in any other arrangement of navigation device, such as one with an integral GPS receiver/computer/display, or a device designed for non-vehicle use (e.g. for walkers) or vehicles other than cars (e.g. aircraft). The navigation device may implement any kind of position sensing technology and is not limited to GPS; it can hence be implemented using other kinds of GNSS (global navigation satellite system) such as the European Galileo system. Equally, it is not limited to satellite based location/velocity systems but can equally be deployed using ground-based beacons or any other kind of system that enables the device to determine its geographic location.

Figure 1:
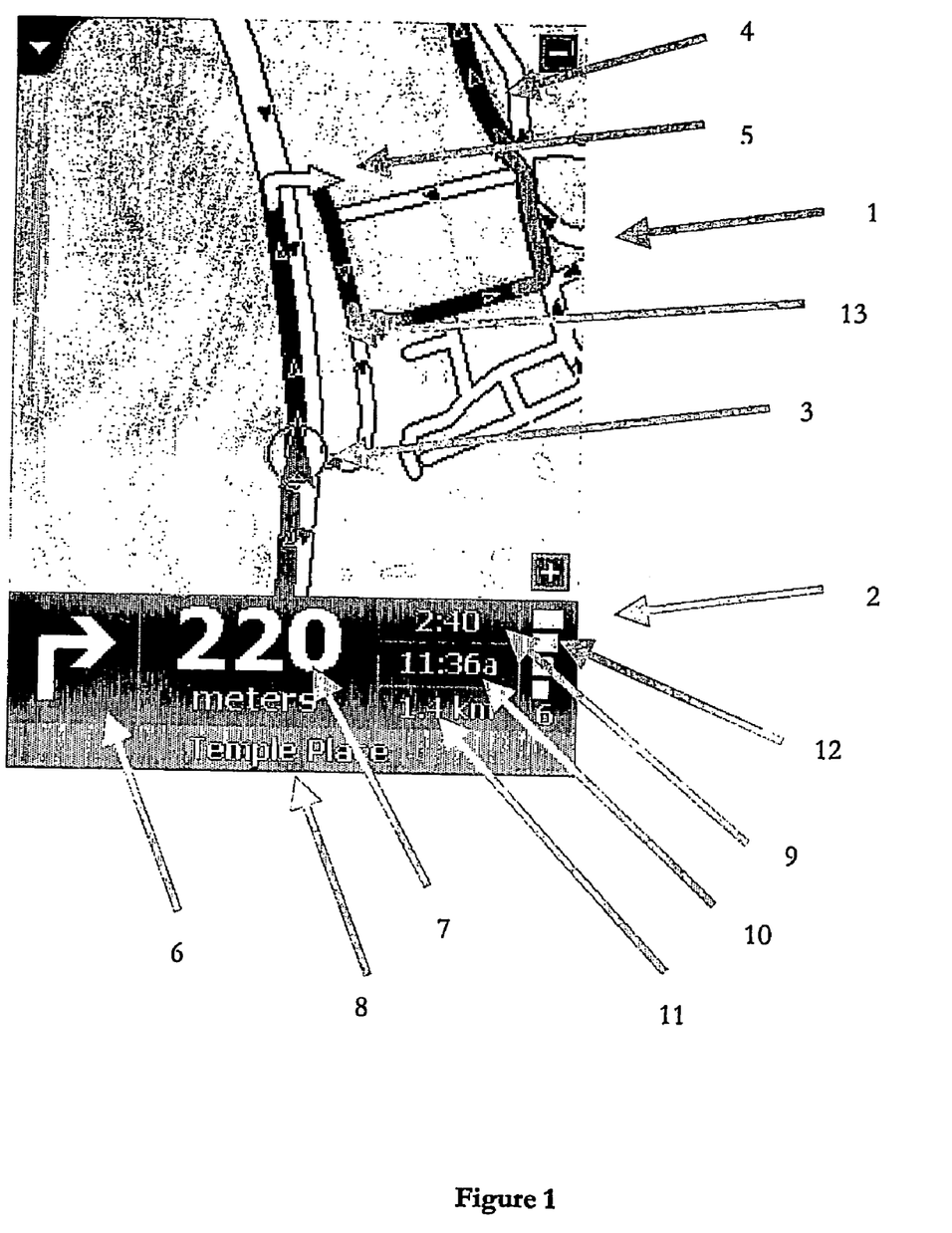
FIG. 1 is a screen shot from a navigation device implementing the present invention; the screen shot shows a plan map view and a status bar running along the bottom of the display.

Navigator software, when running on a PDA, results in a navigation device that causes the normal navigation mode screen shown in FIG. 1 to be displayed. This view provides driving instructions using a combination of text, symbols, voice guidance and a moving map. Key user interface elements are the following: a 2-D map 1 occupies most of the screen. The map shows the user's car and its immediate surroundings, rotated in such a way that the direction in which the car is moving is always "up". Running across the bottom quarter of the screen is the status bar 2. The current location of the device, as the device itself determines using conventional GPS location finding and its orientation (as inferred from its direction of travel) is depicted by an arrow 3. The route calculated by the device (using route calculation algorithms stored in device memory as applied to map data stored in a map database in device memory) is shown as darkened path 4 superimposed with arrows giving the travel direction. On the darkened path 4, all major actions (e.g. turning corners, crossroads, roundabouts etc.) are schematically depicted by arrows 5 overlaying the path 4. The status bar 2 also includes at its left hand side a schematic 6 depicting the next action (here, a right turn). The status bar 2 also shows the distance to the next action (i.e. the right turn—here the distance is 220 meters) as extracted from a database of the entire route calculated by the device (i.e. a list of all roads and related actions defining the route to be taken). Status bar 2 also shows the name of the current road 8, the estimated time before arrival 9 (here 2 minutes and 40 seconds), the actual estimated arrival time 10 (11.36 am) and the distance to the destination 11 (1.4 Km). The GPS signal strength is shown in a mobile-phone style signal strength indicator 12.

If the user touches the centre of the screen 13, then a navigation screen menu is displayed; from this menu, other core navigation functions within the Navigator application can be initiated or controlled. Allowing core navigation functions to be selected from a menu screen that is itself very readily called up (e.g. one step away from the map display to the menu screen) greatly simplifies the user interaction and makes it faster and easier.

The area of the touch zone which needs to be touched by a user is far larger than in most stylus based touch screen systems. It is designed to be large enough to be reliably selected by a single finger without special accuracy; i.e. to mimic the real-life conditions for a driver when controlling a vehicle; he or she will have little time to look at a highly detailed screen with small control icons, and still less time to accurately press one of those small control icons. Hence, using a very large touch screen area associated with a given soft key (or hidden soft key, as in the centre of the screen 13) is a deliberate design feature of this implementation. Unlike other stylus based applications, this design feature is consistently deployed throughout Navigator to select core functions that are likely to be needed by a driver whilst actually driving. Hence, whenever the user is given the choice of selecting on-screen icons (e.g. control icons, or keys of a virtual keyboard to enter a destination address, for example), then the design of those icons/keys is kept simple and the associated touch screen zones is expanded to such a size that each icon/key can unambiguously be finger selected. In practice, the associated touch screen zone will be of the order of at least 0.7 cm$^2$ and will typically be a square zone. In normal navigation mode, the device displays a map. Touching the map (i.e. the touch sensitive display) once (or twice in a different implementation) near to the screen centre (or any part of the screen in another implementation) will then call up a navigation menu (see FIG. 3) with large icons corresponding to various navigation functions, such as the option to calculate an alternative route, and re-calculate the route so as to avoid the next section of road (useful when faced with an obstruction or heavy congestion); or recalculate the route so as to avoid specific, listed roads.

The actual physical structure of the device itself may be fundamentally no different from any conventional handheld computer, other than the integral GPS receiver or a GPS data feed from an external GPS receiver. Hence, memory stores the route calculation algorithms, map database and user interface software; a microprocessor interprets and processes user input (e.g. using a device touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination in the normal manner into the Navigator software running on the PDA using a virtual keyboard. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of Navigator (or is otherwise accessed by it) running on the PDA as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the Navigator software. The algorithms are applied to score large numbers of potential different routes. The Navigator software then evaluates them against the user defined criteria (or device defaults), such as a full mode scan, with scenic route, past museums, and no speed camera. The route which best meets the defined criteria is then calculated by a processor in the PDA and then stored in a database in RAM as a sequence of vectors, road names and actions to be done at vector end-points (e.g. corresponding to pre-determined distances along each road of the route, such as after 100 meters, turn left into street x).

Route Re-Calculation

An implementation of the present invention facilitates access to functions that enable alternative routes to be calculated by placing a menu of graphical icons (or any other kind of way or option to allow selection of the functions, such as lists, check boxes etc.) on a menu screen that is easily accessed from the main navigation screen—i.e. the screen that is displayed during actual or simulated/preview navigation. As noted above, in normal navigation mode (and also the 'demonstrate route' mode for simulated/preview navigation—see later), the device displays an animated map that shows the location of the navigation device as the journey progresses. Touching the map (i.e. the touch sensitive display) once (or twice in a different implementation) near to the screen centre (or any part of the screen in another implementation) will then call up a 'Recalculate' menu screen (see FIG. 3) with large icons corresponding to various navigation functions, such as the option to calculate an alternative route 3C; re-calculate the route so as to avoid the next section of road 3A (useful when faced with a roadblock); and recalculate the route so as to avoid specific, listed roads 3B. The following sections describe these and other alternative route functions in more detail. Some of these functions may be initiated directly from the Recalculate menu screen; others may be at a deeper level in the menu structure. However, all can be initiated by selecting options such as graphical icons, lists, check boxes which are unambiguously associated with touch screen areas that are large enough to allow the user to select them with a fingertip whilst safely driving, typically at least 0.7 cm$^2$ in area.

Alternative Route Function: 'Avoid Roadblock'

Figure 3:
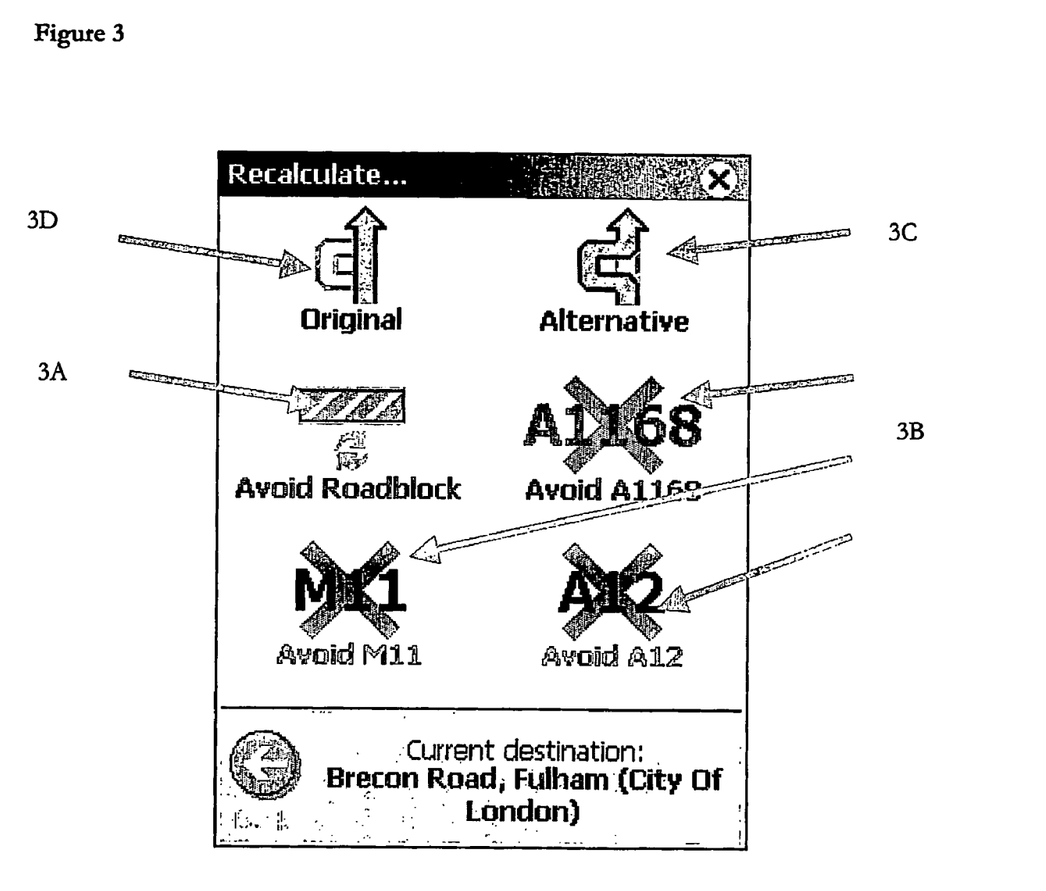
FIG. 3 is a screen shot from the navigation device showing various route planning functions that enable a user to require the device to plot a new route to the destination that (i) is an alternative route; (ii) avoids a roadblock immediately ahead; (iii) avoids predefined roads or (iv) is a reversion to the original route.

With this function, a user could select an 'avoid roadblock' function 3A that causes the system to recalculate a route on the basis that the road immediately ahead (or some user defined or system default distance ahead, e.g. 100 metres) is blocked.

As noted earlier, a route planning algorithm in Navigator will work out an optimal route (optimal may refer to criteria such as shortest time or shortest distance, or some other factors) by exploring different routes and scoring them against the required criteria. In this way, one route which best meets the defied criteria is generated. If whilst actually driving along a route, an unexpected event occurs that requires the user to detour away from the pre-calculated route, such as a roadblock, the user can inform the Navigator software that his immediate road ahead is blocked and require the software to re-calculate a new route, taking his current position as a new starting position, but taking the first turning possible away from the old calculated route. This first turning might be ahead or behind the current car position. The system, in constructing the new route, explores a large number of possible routes to the destination from the current position, but excludes the road immediately ahead.

Figure 2:
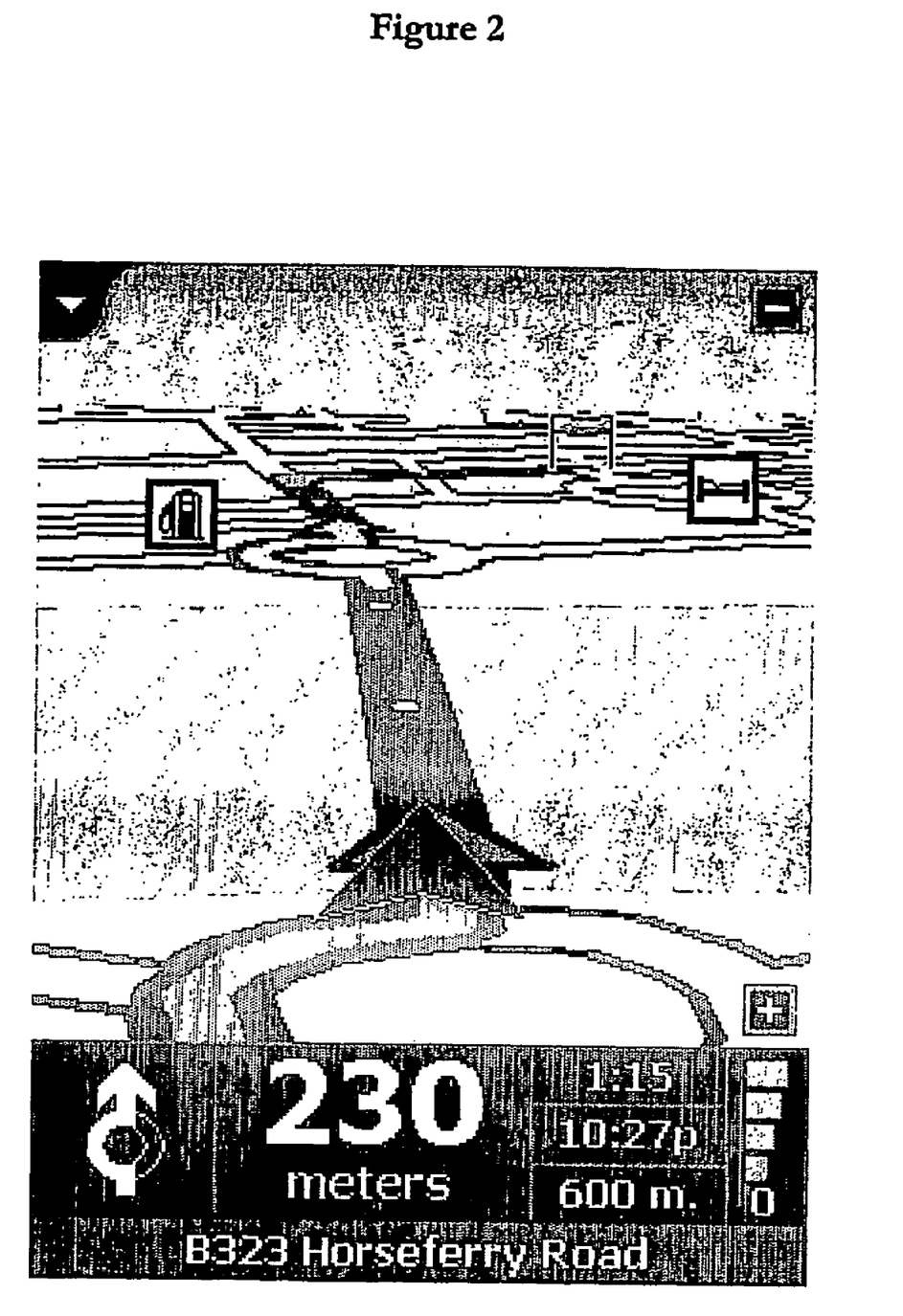
FIG. 2 is a screen shot from the navigation device implementing a 3-D view.

Selecting the 'avoid roadblock' function 3A has to be fast and involve the absolute minimum number of screen interactions to minimise driver distraction. This can be achieved by the user being able to switch from normal navigation mode (in which the current position of the car is shown on a map, as shown in FIG. 1 or 2) to a Recalculate menu mode, as shown in FIG. 3, by pressing a key or selecting any point on the screen or selecting a given region of the screen. Where a given region has to be selected (e.g. the approximate centre of the map), then the touch activation zone is sufficiently large that it can readily and reliably be selected by a user with his fingertip without needing to look carefully at the screen for more than a moment. A touch zone of 0.7 cm$^2$, centred on the map, has been found to be sufficient.

The FIG. 3 menu mode displays a small number of large icons, one of which is the 'avoid roadblock' 3A option. This can be selected with one touch; when this occurs, the software re-calculates the route and gives instructions in the normal manner (voice; and/or on screen navigation prompts) to allow the user to proceed to his destination but avoid the road immediately ahead.

Alternative Route Function: 'Avoid Specific Road'

This function allows a user to easily and rapidly select a specific, named road 3B to mark as blocked so that he can use information from real time traffic information broadcasts on the radio.

When listening to the radio, a user may hear that a specific road or perhaps part of a motorway between defined junctions is blocked or heavily congested. If that road is on the user's calculated route, even though it might be many kilometres away, then he will want to have the software recalculate a new route as soon as possible. The system does this by calculating a route to the final destination using the current position as a start position and exploring different routes to the destination, but excluding the road indicated as to be avoided. The new route will then be calculated using normal route planning algorithms and the user diverted onto the new route.

Selecting the 'avoid specific road' function 3B has also to be fast and involve the absolute minimum number of screen interactions to minimise driver distraction. This can be achieved by the user being able to switch from normal navigation mode (FIG. 1 or 2, in which the current position of the car is shown on a map) to a Recalculate menu mode as described earlier (e.g. selecting a given region on the screen); the Recalculate menu displays a small number of large icons, several of which are named roads 3B on the route which, if selected, can be selected with one touch; when this occurs, the software re-calculates the route and gives instructions in the normal manner (voice; and/or on screen navigation prompts) to allow the user to proceed to his destination but avoid the road immediately ahead. The device may have limited screen space to display many roads for exclusion; the FIG. 3 implementation lists three. These three are selected using various weighting, parameters (e.g. a prior history of the user wishing to avoid them; the next three major roads) or from dynamic, updated travel information received by the device from a traffic information data source, indicating that these are the next three roads on the route that are affected by traffic disturbance of some kind.

A final 'original' option 3D allows the user to clear all earlier re-calculation inputs and re-calculate the original route.

A number of other navigation functions can be initiated from deeper in the menu hierarchy than the FIG. 3 menu. These are described below.

Alternative Route Function: 'Penalties'

With this function, the system can also enable a user to mark certain points/regions as blocked or slow or to give penalties (or their inverse, awards) to a point/region to weight routing away from (or to) that point/region and have the system auto calculate an alternative route (or indeed the original route).

Route planning algorithms operate by assigning scores to different possible routes in relation to different criteria (e.g. scores for the time of journey, scores for the length of journey etc) and then determining which route has the best overall score. Normally, the user cannot interact directly with how the algorithm treats roads, junctions and other route features. But in Navigator it is possible: the user can directly alter the way the route planning algorithm evaluates or scores a route by awarding penalties/awards to any items, e.g. points/regions, that affect the route planning scoring. The route planning algorithm stores a list of all roads/junctions in vector form associated with each calculated route from start to destination; each item (e.g. road section, turning etc.) will typically have several parameters associated with it that are used in the scoring process to evaluate a best route. Hence, it is straightforward to alter the route scoring based on giving different weightings to different kinds of items. For example, one user might dislike junctions; in which case, the route scoring could count junction numbers in alternate routes and then weight more favourably routes with fewer junctions. Similarly, roads within certain user defined regions could have some of their scoring parameters altered to change the likelihood of a route being selected using them (either to increase or decrease the likelihood of selection). To enable the user to alter the weightings given to different items, the device could display a list of those items adjacent to check boxes (e.g. 'Like' and 'Don't Like'). Each user could then set up a personal profile that defined his or her personal preferences (e.g. one person might always prefer the scenic and historic; another straightforward driving with minimal junctions; yet another, always the shortest possible distance, irrespective of complexity).

Also, a user could penalise specific complex junctions on a simulated route (see 'Demonstrate route' function below) if they disliked them, or else could indicate that he wanted fewer turnings and the device would then count the number of turnings in alternative routes and give preference to the routes with fewer turnings.

Alternative Route Function: Auto Generate

A user can also simply select 'alternative route' 3C if he wants to see another possible route: the system then recalculates a route, not using at least 80% of the roads from the prior route. If that route is still unsuitable, the user can obtain another alternative route again by selecting again 'alternative route' 3C.

Alternative Route Planning: Selecting Calculation Modes

A user can select 'normal', 'strict' and 'fast' planning modes: each results in different route planning algorithms being used that calculate the route either normally, or strictly (which may take many minutes as a great many permutations are explored) or quickly, (which may take a few seconds only as many simplifying assumptions are made about the optimal route).

Alternative Route Planning: POI Navigation

The system offers a "navigate to nearby point of interest" option. This first provides a hot list of POI (point of interest) icons for the small set of most often used POI types.

The list is initialized to generally useful POI types (for car drivers) like petrol stations, restaurants, parking spots etc. Hence, a user can very readily ask the program to calculate a new route that will navigate him to the nearest petrol station etc. This can happen during the course of a drive—i.e. the user realises that he is low on fuel and will need the route to be re-calculated to pass by a petrol station, whilst still maintaining the original destination.

The system can in effect recalculate a route with the closest relevant POI as the destination and the current location as the start The user can manually adjust the types to suit his own needs. Furthermore, at least one of the icons will self-adjust to the most recently used type not already in the list.

Re-calculating a route to include a POI requires the system to implement a search for POIs. This would normally be done by defining a point and searching outwards from that point to locate relevant POIs. Applying this approach to finding POIs along a route would be impossible on a PDA because you would in effect be replicating the search for all points along the route (potentially millions of separate searches for a long journey, which would be too great a load). In this implementation, this approach is reversed by taking each relevant POI and seeing if it is on a vector/line that that also defines part of the route—a simple and fast correlation process between POIs and route lines, that can rapidly be repeated for all POIs of relevance and for each candidate route. This POI location method can be used whenever POIs need to be found. When re-calculating a route so that it includes a POI of a given type, the route calculation algorithm takes as its start position the current location and maintains the original destination. It then selects only those routes that include the POI of the required type (using the simple correlation process of seeing if any vector of the calculated route matches the vector associated with each POI of the required type) and weights most favourably those with a POI nearest the current location.

Demonstrate Route Function

The present invention implements a 'Demonstrate route' preview or simulation function. This allows the user to see the entire proposed route, as calculated by the Navigator software, in animated fashion as if he were driving it. First, a route is calculated in the normal manner. Then, a 'demonstrate route' icon or menu option is automatically displayed by the device after the route is calculated. As with all major navigation functions, this is represented by a large icon with an associated touch screen area large enough to be readily selected by a fingertip, such as at least 0.7 cm$^2$. After the icon has been selected, the device displays a sequence of preview maps that shows the car driving from the start position to the destination. Generally, the maps will be animated to scroll past a fixed point representing the vehicle position, although it is possible to arrange for the position of the vehicle to advance as though travelling along a road, or for there to be some combination of relative movement between car and route.

Other useful control functions can mimic the video/media player control functions found on a PC; for example, to fast forward through the simulation/preview and to pause, play, and rewind. The status bar data (especially time of arrival, further journey time and remaining distance) should remain accurate as the off-line simulation of the route plays. This gives the user a good feel for not only the spatial definition of the route, but also its temporal definition.

During normal preview (e.g. when a 'play' button on a media player style control is selected), each road name is displayed in the status bar 8. One possible refinement is to only display the road name if it will remain visible for more than a predetermined time (e.g. 1 second). Whilst the preview is fast forwarding, then road names may not be displayed if they would not be legible (in less sophisticated implementations this feature may be absent). Road names may also displayed if the pause is selected or if the simulated speed of the vehicle is otherwise slowed down below a defined level.

During normal preview, road names are therefore displayed in the status bar 8 or superimposed over the road itself in the map (whether 2-d or 3-D), in the same way that they are displayed during normal real-time operation, greatly enhancing the realism and utility of the preview function. For example, the 'demonstrate route' function is very helpful in enabling users/passengers to assess and confirm that the route is acceptable. The user can familiarise himself with the road names in the same context as they will appear on the device when actually driving. For some vehicles, such as taxis, this is especially valuable for the passenger. It is also very useful for point-of-sale purposes to catch the eye of potential purchasers of the Navigator software and GPS system; hence, at a retail store, replaying a route on a PDA using Navigator may be desirable.

The user can therefore, with the present invention, ask for the entire journey along the route to be simulated on a map displayed on the device: in the conventional manner, the position of the car on the displayed map is marked with an arrow; as the journey simulation progresses, the streets move past the car arrow, which is optimally fixed approximately $\frac{1}{3}^{rd}$ up from the bottom of the map, and centred. The car is hence shown actually navigating along the route calculated by the Navigator software. In this way, a user can check that the route looks acceptable; the user may for example, prefer a route that avoids a certain region and he may want to confirm that the route suggested by the program does bypass it Or the user may simply feel more comfortable driving a route that he has had fully described and shown to him by the software before hand. In a point of sale system, the simulation can continuously repeat.

The animated maps may be in 2-D view (e.g. as shown in FIG. 1) or in 3-D, as shown in FIG. 2. 3-D animations (as well as real-time 3-D map views) can be altered to change the simulated viewing height; for example, for aviation use, it may be very useful to be able to show a 3-D view of an entire flight route from a simulated height useful to the pilot. This height may vary automatically depending on the height of the plane; in addition, simulated height (as well as other kinds of perspective alteration) controls can be added as, for example, control icons on the edge of the screen. The simulated height above ground and/or perspective of the 3-D map can also alter automatically as the rate of progress alters—e.g. for very rapid preview (corresponding to very fast vehicle speed) then the simulated height above ground can increase to give better visibility.

The demonstrate route function can also be usefully deployed when the user wishes to have an alternative route calculated by the device and wants that alternative route animated as an off-line simulation or preview. For example, whilst the simulation is running, the user can, by touching the screen, task away from the simulation to a menu screen (FIG. 3) which displays one or more options that, if selected through a touch action, initiate a re-calculation of the route. The menu screen displays icons relating to one or more of the following functions:
(a) calculate alternative route;
(b) calculate alternative route without including a pre-defined extent of the road ahead;
(c) calculate alternative route without including a pre-defined road;

Once a re-calculation has been performed, the device automatically displays an option to initiate a simulation of that recalculated route.

Equally, the preview function can be initiated during actual, real progress along a calculated route; for example, the user may wish to re-calculate a new route (perhaps finding heavy congestion); he then touches the screen to task away from the navigation map and then reaches the menu screen that displays the route re-calculation options (FIG. 3). Once re-calculation is complete, the device automatically displays a 'demonstrate route' icon. This is particularly useful after re-calculation during an actual journey as the user may wish to verify that that the re-calculated route is appropriate (e.g. does not use roads that the user now knows should not be used because of congestion etc.) by viewing the preview/simulation.

The invention claimed is:

1. A navigation device programmed with a map database and software that enables a route to be planned between two user-defined places, wherein the device is further programmed to be able to display a navigation map on a touch screen display, the navigation map showing a current position of the device on a planned route; and wherein the device is further programmed to task away completely from the navigation map, when the touch screen display showing the navigation map screen is touched by a user, to a menu screen which displays a plurality of touch-selectable options relating to route calculation, the touch activation of at least one of which initiates a re-calculation of the route to find a detour away from the planned route.

2. The device of claim 1, wherein the device is further programmed to initiate the task away by at least one of a single and a double touch anywhere on the touch screen.

3. The device of claim 1, wherein the device is further programmed to initiate the task away by at least one of a single and a double touch at a region of the touch screen sized to be sufficiently large to allow it to be reliably selected with a fingertip.

4. The device of claim 3, wherein the region is centered on the navigation map.

5. The device of claim 3, wherein the region is at least 0.7 cm$^2$ in area.

6. The device of claim 1, wherein one of the plurality of touch-selectable options relates to a function of calculating an alternative route.

7. The device of claim 1, wherein the navigation map is at least one of a preview and a simulation of a journey along the route, and wherein the current position is a simulated current position.

8. The device of claim 1, wherein each selectable option is one of the following:
(a) a graphical icon;
(b) a control or check box; or
(c) a name.

9. The device of claim 1, further configured to enable a user to alter a way a route is at least one of evaluated and scored by a route calculation algorithm.

10. The device of claim 9, wherein enabling the altering of the way a route is at least one of evaluated and scored is achieved by allowing the user to alter the weight given to any item used in the evaluation of a route.

11. The device of claim 1, wherein the map is a 3-D map.

12. The device of claim 1, further configured to display options that allow the user to initiate different route calculation modes.

13. The device of claim 1, further configured to display an option to recalculate a route to include a Point of Interest (POI) of a user-defined type.

14. The device of claim 13, wherein the device is further configured to correlate vectors of POIs of the defined type to vectors in different routes to enable the device to select only those routes that include the required POI.

15. A method of displaying navigation information, the method being deployed in a navigation device programmed with a map database and software that enables a route to be planned between two user-defined places, wherein the device is further programmed to be able to display a navigation map on a touch screen display, the map showing the current position of the device on a planned route, the method comprising:
tasking away completely from the navigation map to a menu screen which displays a plurality of user selectable options relating to route calculation by touching the touch screen display showing the navigation map; and
initiating a re-calculation of the route to find a detour away from the planned route by touching at least one of the plurality of user selectable options displayed on the display screen.

16. Computer software adapted to enable a navigation device, programmed with a map database and software that enables a route to be planned between two user-defined places and displayed on a navigation map on a touch screen display, the map showing the current position of the device on a planned route; wherein the software enables a user, by touching the touch screen display showing the navigation map screen, to task away completely from the navigation map to a menu screen which displays a plurality of touch-selectable options relating to route calculation, the touch activation of at least one of which initiates a re-calculation of the route to find a detour away from the planned route.

17. The device of claim 1, wherein the menu screen is configured to display a selectable option relating to a function of calculating an alternative route without including a predefined extent of the road ahead.

18. The device of claim 1, wherein the menu screen is configured to display a selectable option relating to a function of calculating an alternative route without including a predefined road.

19. The device of claim 1, wherein the menu screen is configured to display a selectable option relating to a function of reverting to an original route.

20. The device of claim 7, further configured to automatically display at least one of a 'demonstrate route' icon and a menu option relating to a preview or simulation function after the route is calculated that, if selected, allows a user to preview the entire proposed route in animated fashion.

21. A method of recalculating a navigation route on an in-vehicle navigation device, the method comprising:

displaying on a display screen of the navigation device a navigation map showing a current position of the device and a planned route;

changing the display on the display screen from the navigation map directly to a menu screen which displays a plurality of touch-selectable options relating to route calculation by touching the display screen; and initiating a calculation of an alternate planned route by touching at least one of the plurality of touch-selectable options on the display screen showing the menu screen.

22. A computer readable medium including program segments for, when executed on an in-vehicle navigation device, causing the navigation device to implement the method of claim 21.

* * * * *